Dec. 2, 1930.  M. L. SINDEBAND ET AL  1,783,548

POWER SYSTEM AND APPARATUS THEREFOR

Filed April 24, 1929

Inventors
Maurice L. Sindeband
Othmar K. Marti
By Alfred H. Dyson
        Attorney Patented Dec. 2, 1930

1,783,548

UNITED STATES PATENT OFFICE

MAURICE L. SINDEBAND, OF NEW YORK, N. Y., AND OTHMAR K. MARTI, OF HADDONFIELD, NEW JERSEY, ASSIGNORS TO AMERICAN BROWN BOVERI ELECTRIC CORPORATION, OF NEW YORK, N. Y., A CORPORATION OF NEW YORK

POWER SYSTEM AND APPARATUS THEREFOR

Application filed April 24, 1929. Serial No. 357,839.

This invention relates to improvements in power systems and apparatus therefor.

It frequently occurs that a high-voltage line of 60,000 or more volts passes through or in proximity to a farm or rural district which might derive an electrical supply therefrom if it were not for the prohibitive cost of the step-down transformer necessary to reduce the relatively high voltage to the required value, that is, for example, about 2300 volts. The relatively high cost of the step-down transformers which would be necessary for this purpose, and which have been proposed heretofore, is due mostly to the relatively high cost of the two high-voltage insulating bushings carrying the leads or terminals providing an operating connection between the high-tension winding of the transformer and the high-tension line.

One of the objects of the present invention, therefore, is to provide an improved power system and apparatus therefor, whereby a low voltage may be obtained from a high-voltage transmission line, and which, in a very simple and economical way, makes possible omission of the two expensive high-voltage bushings referred to above and which have been necessary in systems used heretofore.

Other objects and advantages will hereinafter appear.

In accordance with the invention, part of the casing of the step-down transformer is made of insulating material, the connections and disposition of the various parts being such that the transformer casing itself performs the office or function of the two expensive high-voltage bushings which have been necessary in constructions proposed heretofore.

Figure 1:
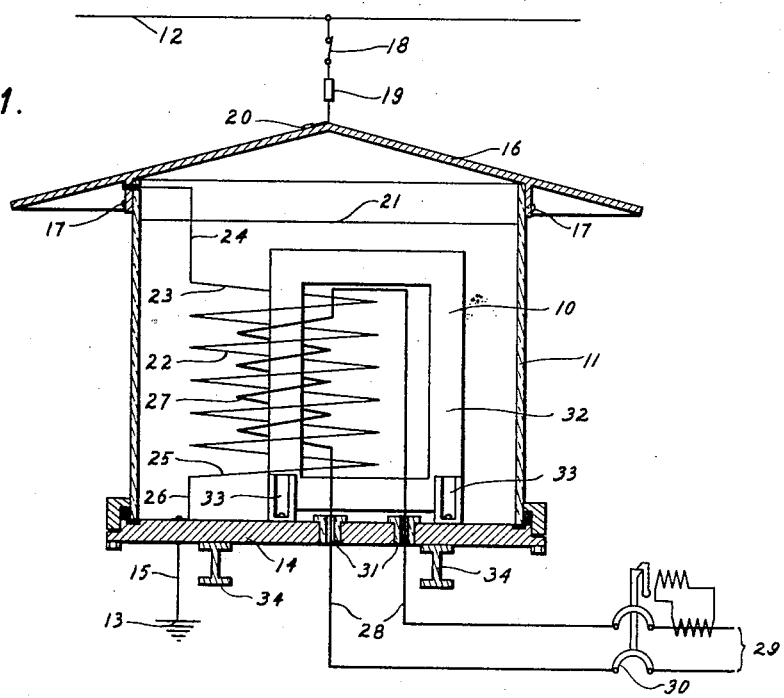
Figure 2:
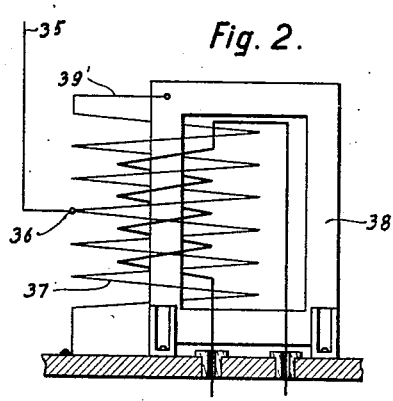
Figure 3:
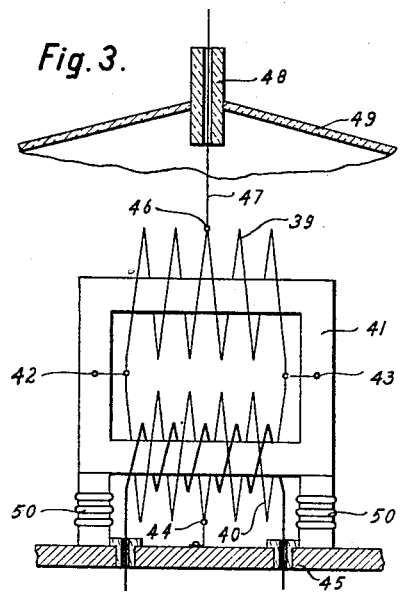
Figure 4:
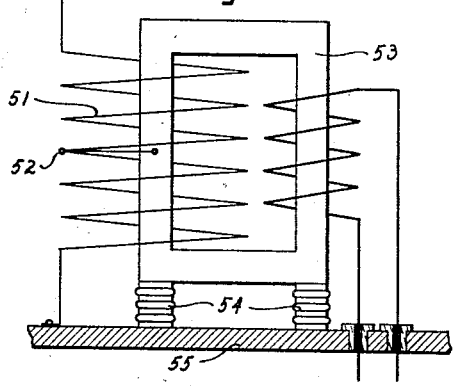

For the purpose of illustrating the invention, several embodiments thereof are shown in the drawings, wherein Figure 1 is a partly schematic and partly sectional view showing a power system embodying the present invention, and the improved apparatus for the system;

Figs. 2, 3 and 4 are diagrammatic views showing various modifications.

In Fig. 1 the transformer, indicated generally by the reference numeral 10, is shown disposed within a hollow member 11 of insulating material and disposed between the alternating-current supply line 12 and ground 13.

A base 14 of metallic material is associated with the ground-end of member 11 and is connected thereto in any suitable manner, the base being grounded through connection 15.

A cover or hood 16 of metallic material is associated with the line-end of member 11 and is secured thereto in any suitable manner such as by bolts or rivets 17, the outer edge portion of the cover extending outwardly beyond member 11 an appreciable distance for the purpose of preventing adherence of rain and snow to the exposed surface of member 11 at the uppermost end portion thereof directly under the cover.

The cover 16 is electrically connected to line 12 through a suitable switch 18 and fuse 19, the connection at 20 being made by soldering, electric welding, or in any other suitable manner such as to provide a good connection to the cover without drilling holes therein.

The insulating member 11 and the base 14 and cover 16 associated therewith constitute an enclosing casing for transformer 10, the casing being substantially filled with oil to about the level indicated by line 21.

The transformer 10 includes the high-voltage winding 22 having its high-voltage end 23 disposed in proximity to the line-end of member 11 and connected to cover 16 by connection 24.

The other end 25 of winding 22 is disposed, as shown, in proximity to the ground-end of member 11 and is connected to base 14 by connection 26.

The low-voltage winding 27 of the transformer is connected by leads 28 to the local or consumers' line 29, suitable switch means 30 providing for connection or disconnection of line 29 with leads 28. The primary leads 28 pass through base 14 by way of suitable insulating bushings 31.

The core 32 of the transformer is electrically connected and rigidly secured to base 14 by suitable clamps or brackets 33.

From the foregoing, it will be seen that in the present improved system the insulating portion or part 11 of the transformer casing operates of itself to provide the same degree of insulation between the high and low-voltage leads or terminals of the high-voltage winding as has been provided by the high-voltage insulating bushings in constructions used heretofore.

In the embodiment of Fig. 1, it will be seen that the improved disposition and manner of connection of the parts, wherein base 14 is grounded, permit of the mounting of the transformer apparatus directly on one of the poles or towers supporting the high-voltage line 12. For this purpose, the transformer apparatus may be supported on girders 34 secured to or forming part of the line pole or tower.

In the embodiment of Fig. 2, the connection 35, corresponding to connection 24 in Fig. 1, leads to the midpoint 36 of the high-voltage winding 37. The upper end of winding 37 is connected to core 38 by connection 39'. Otherwise, the arrangement in Fig. 2 is identical to that in Fig. 1.

In the embodiment of Fig. 3, the high-voltage winding comprises the two winding portions 39 and 40 connected in series, as shown, and having their respective ends grounded to core 41 at the points 42 and 43. The midpoint 44 of winding portion 40 is connected to the metallic base 45. The midpoint 46 of winding portion 39 is connected directly to the high-voltage transmission line by connection 47, the latter passing through a suitable bushing 48 extending through the cover or hood 49 of insulating material. The core 41 is supported on suitable insulators 50 interposed between the same and base 45. The arrangement and construction, otherwise, are identical to that in Fig. 1.

In the embodiment of Fig. 4, the high-voltage winding 51 is connected at its midpoint 52 to core 53, the latter, as in Fig. 3, being supported on suitable insulators 54 interposed between the same and the metallic base 55. Otherwise, the arrangement and construction in Fig. 4 are the same as in Fig. 1.

The different connections and arrangements of Figs. 2, 3 and 4 offer possible advantages over the connection and arrangement in Fig. 1 in the way of providing for better voltage distribution and correspondingly cheaper and simpler insulating construction between the high-voltage winding and the transformer core and low-voltage winding.

From the foregoing, it will be seen that an improved power system and apparatus therefor have been provided wherein the necessity for using expensive high-voltage insulating bushings is avoided, while providing for the same advantages and desirable characteristics of operation as in the prior art constructions, accordingly making possible utilization of a high-voltage transmission line for providing a low-voltage supply at a cost appreciably lower than has been possible heretofore.

While several embodiments of the present invention have been shown and described, it will be understood that various changes might be made without departing from the spirit of the invention or the scope of the claims.

The invention claimed is:

1. In a power system, an alternating-current supply line, a hollow insulating member interposed between said line and ground, a grounded metallic base associated with the ground-end of said member, a cover associated with the line-end of said member and connected to said line, and transformer apparatus disposed within said member and including a winding connected between said line and ground.

2. In a power system, an alternating-current supply line, a hollow insulating member interposed between said line and ground, transformer apparatus disposed within said member, a grounded metallic base associated with the ground-end of said member, and a cover associated with the line-end of said member, said member and said base and cover associated therewith constituting an enclosing casing for said apparatus, said apparatus including a winding having a high-voltage end disposed in proximity to the line-end of said member and connected to said line and having a ground-end disposed in proximity to the ground-end of said member and connected to said base.

3. In a power system, an alternating-current supply line, a hollow insulating member interposed between said line and ground, transformer apparatus disposed within said member, a grounded metallic base associated with the ground-end of said member, and a cover associated with the line-end of said member and connected to said line, said member and said base and cover associated therewith constituting an enclosing casing for said apparatus, said apparatus including a winding having a high-voltage end disposed in proximity to the line-end of said member and connected to said cover and having a ground-end disposed in proximity to the ground-end of said member and connected to said base.

4. In apparatus of the character described, a hollow insulating member, a transformer disposed within said member, a grounded base associated with one end of said member, and a cover associated with the other end of said member, said member and said base and cover associated therewith constituting an enclosing casing for said transformer, said transformer including a high-tension winding having its high-voltage end disposed in proximity to the cover-end of said member and connected thereto and its other end disposed in proximity to the base-end of said member and grounded thereon.

5. In apparatus of the character described, a hollow insulating member, a transformer disposed within said member, a grounded base associated with one end of said member, and a metallic cover associated with the other end of said member, said member and said base and cover associated therewith constituting an enclosing casing for said transformer, said transformer including a high-tension winding having its high-voltage end disposed in proximity to the cover-end of said member and connected thereto and connected to said cover and having its other end disposed in proximity to said base and grounded thereon.

In witness whereof, I hereto affix my signature this 20th day of April, A. D. 1929.

MAURICE L. SINDEBAND.

In witness whereof, I hereto affix my signature this 18th day of April, A. D. 1929.

OTHMAR K. MARTI.